UNITED STATES PATENT OFFICE.

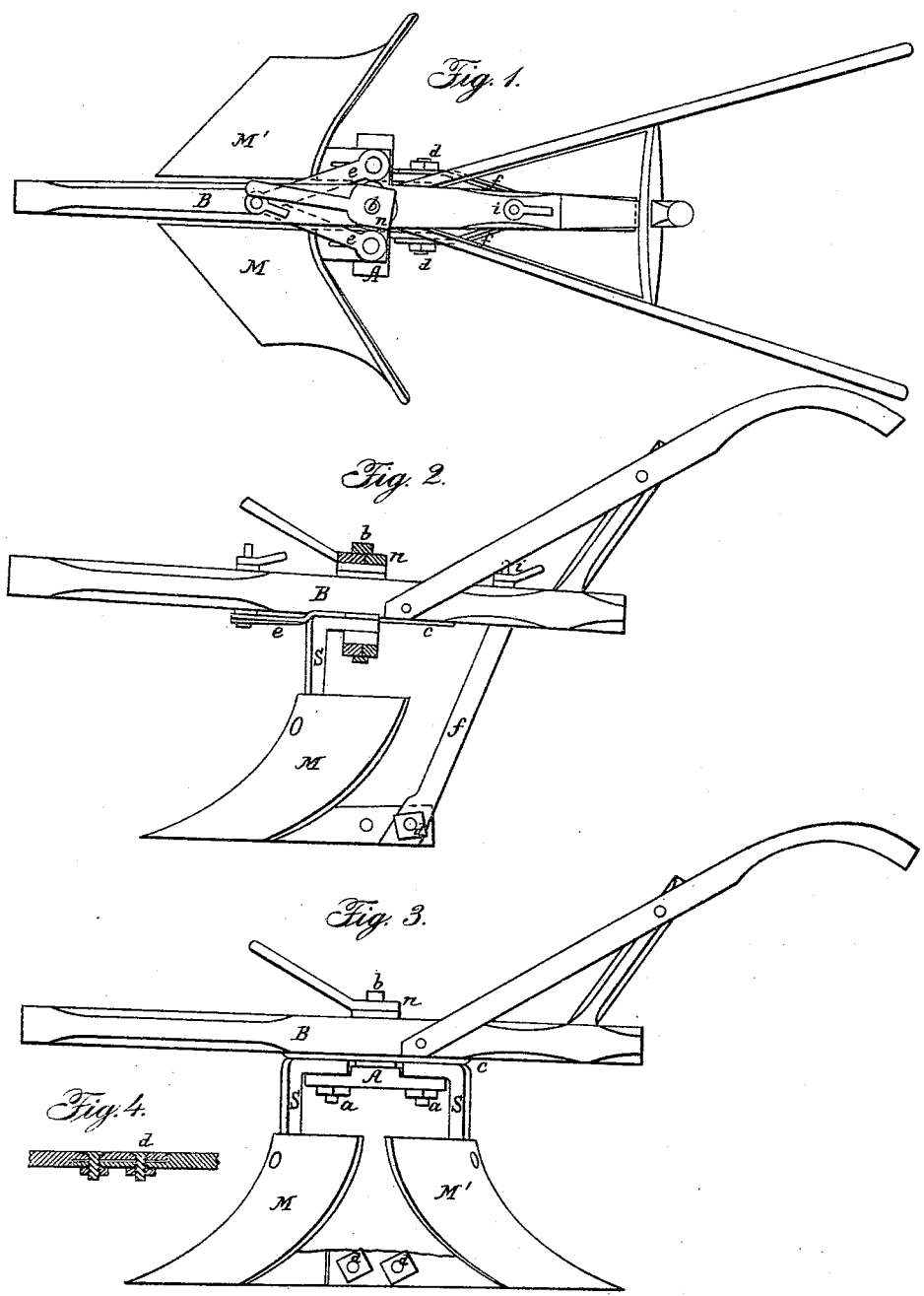

WILLIAM O'NEILL, OF PINE LEVEL, ALABAMA.

IMPROVEMENT IN PLOWS.

Specification forming part of Letters Patent No. 25,436, dated September 13, 1859.

*To all whom it may concern:*

Be it known that I, WM. O'NEILL, of Pine Level, in the county of Montgomery and State of Alabama, have invented a new and useful Improvement in Plows; and I do hereby declare that the following is a full, clear, and exact description of the same, reference being had to the annexed drawings, forming part of this specification, in the several figures of which similar characters of reference denote the same part.

Figure 1 is a top view of my improved plow, with the mold-boards adjusted in position to form a double plow. Fig. 2 is a side view of the same in position of Fig. 1. Fig. 3 is a side elevation, with the plows adjusted to form a hillside-plow. Fig. 4 is a sectional view, showing the connection of the landsides.

The nature of the invention consists in having two separate plows, one right and the other left, constructed independently of each other, and so adjustable by means of certain bolts and braces that they may be arranged so as to form a hillside or a double plow, or by the use of only one of them a single plow, as will be hereinafter set forth, the details of construction and operation being as follows:

The two plows (represented in the drawings by M M') are connected at the top by the bar A, to each end of which they are fastened by bolt $a$. This bar A is secured to beam B by bolt $b$ and nut $n$. Under the beam B is a plate, $c$, having a projection which fits in a groove in top of stock S of the plows, so as to hold them steady in place.

The landsides can also be connected by bolts $d$, as seen in Fig. 4, so that when it is required to be used as a hillside-plow the plows are attached to each end of connecting-bar A by bolts $a$, as shown in Fig. 3, said bar being placed longitudinally under the beam and secured to it by bolt $b$ and nut $n$, and the landsides, lapping over each other, are connected by bolts $d$, Fig. 4, so that at the end of each furrow by loosening nut $n$ the bar A, with the plows, may be reversed and the earth thrown on the same side every round. When used as a double plow the bar A is placed across the beam and the plows attached to each end thereof, with their points opposite each other and pointing in the same direction; and there are two braces, $f$, attached to the heels of the plow by bolts $d$, and to the beam by a screw and nut, $i$, and also braces $e$ from the stocks S to the beam, for the purpose of holding the plows steady and preventing them from working backward and forward. When arranged in this manner the plow becomes a double one, suitable for any purpose for which it may be required, and by leaving off either of the plows a single plow may be formed, either right or left, as desired.

What I claim, and desire to secure by Letters Patent, is—

The lapping landsides of the plows and the bar A, attached to the beam, as specified, in combination with the bolts, nuts, and braces described, whereby there may be formed at pleasure a double or hillside-plow, as set forth.

In testimony whereof I have hereunto signed my name before two subscribing witnesses.

WM. O'NEILL.

Witnesses:
 GEO. PATTEN,
 JOHN S. HOLLINGSHEAD.